Feb. 3, 1970    C. D. BOSCO ET AL    3,492,857
VISCOMETER

Filed March 11, 1968    2 Sheets-Sheet 1

INVENTORS,
CHARLES D. BOSCO
J. DEAN BARNETT.

BY *Milton M. Davis*
*Harry M. Saragovitz,*
*Edward J. Kelly & Herbert Berl*

ATTORNEYS.

Feb. 3, 1970

C. D. BOSCO ET AL 3,492,857

VISCOMETER

Filed March 11, 1968

INVENTORS,
CHARLES D. BOSCO
J. DEAN BARNETT.

BY

ATTORNEYS.

United States Patent Office 3,492,857
Patented Feb. 3, 1970

---

3,492,857
VISCOMETER
Charles D. Bosco, Lakewood, N.J., and John Dean Barnett, Provo, Utah, assignors to the United States of America as represented by the Secretary of the Army
Filed Mar. 11, 1968, Ser. No. 712,022
Int. Cl. G01n *11/02*
U.S. Cl. 73—54           2 Claims

ABSTRACT OF THE DISCLOSURE

An instrument for determining fluid viscosity that includes separate spaced coils of pressure responsive wire having the same static resistivity. One of the coils is first subjected to liquid pressure to change its resistivity. Later the second coil is also subjected to liquid pressure to change its resistivity. The viscosity can be measured as a function of the time lapse between the said changes of viscosity.

---

The invention described herein may be manufactured, used, and licensed by or for the Government for governmental purposes without the payment to us of any royalty thereon.

BACKGROUND OF THE INVENTION

There are at present many instruments designed to measure fluid flows of widely varied viscosities. Many of these however employ impellers, vanes, orifices and the like, disposed in the flow path of the fluid to be measured. All of these have the features of reducing the cross-sectional area of the flow path by relying on fixed obstruction therein.

Such meters are not completely adequate when measuring the flow rates of viscosities of highly viscous materials, such as heavy oils and residuums. It has also been found that such devices are not entirely adequate or workable in systems or areas where extremely high pressures are utilized, i.e. in the neighborhood of one million p.s.i.

SUMMARY OF THE INVENTION

The primary object of the present invention is to provide a viscometer capable of operation in extremely high pressure areas which are believed out of the range of viscometers presently available.

Another object of the invention is the provision of a viscometer that does not require the flow or movement of a fluid through a pipe to measure the viscosity of such fluid.

Another object is to provide a viscometer that is extremely small in size and yet provide a workable device.

In accordance with the present invention there is provided a viscometer which includes a tubular portion having wound thereon a pressure responsive wire, said tubular portion being confined within a container also surrounded by a pressure responsive wire. A bridge type circuit is utilized for measuring the resistance of the response of the wires to pressure about the tubular element with respect to time. By plotting time versus resistance there is provided a decay curve which can be directly related to the viscosity of the pressure transmitting fluid. By such means it is possible to measure change in viscosity of liquids subjected to pressures of up to 1,000,000 pounds per square inch.

BRIEF DESCRIPTION OF THE DRAWINGS

The exact nature of this invention will be apparent from a consideration of the following specification and the accompanying drawings in which.

DESCRIPTION OF THE PREFERRED EMBODIMENT

Figure 1:
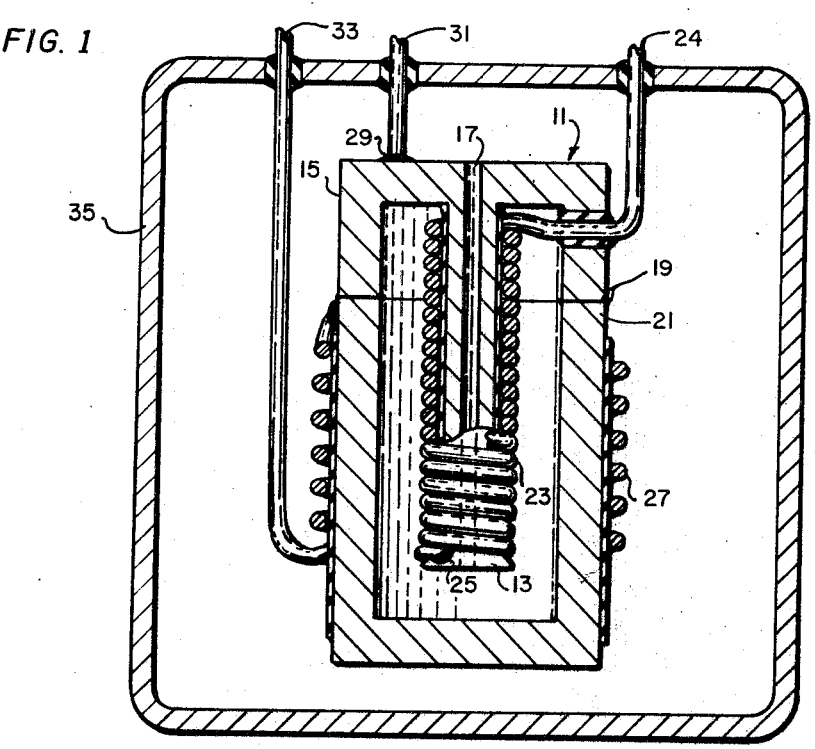
FIG. 1 is a cross-sectional view of a preferred embodiment of the invention.

Referring now to the drawing, there is shown a viscometer generally designated as 11 and includes a tube element which comprises a cylindrical tubular segment 13 and a cap segment 15 integral therewith. The bore of the tubular segment 13 is shown at 17. The diameter of the bore 17 can vary from an extremely small diameter such as 0.015 inch to as large as needed. The lower edge of the cap segment 15 is tinned at 19 or otherwise metallized, to provide a base for soldering thereto a container section 21, which when affixed to the cap segment 15 surrounds the tubular segment 13. From an inspection of FIG. 1 it can be seen that the viscometer is a completely sealed unit except for the bore 17 extending through the tubular segment 13.

Wound about the tubular segment 13 is a coil 23 of pressure responsive wire such as of manganin or similar material such as used in strain gauges and having a prescribed static resistivity. Insulation between the wire coil 23 and the tubular segment 13 is provided by an epoxy or other insulating material which also serves to seat the coil 23 in place. One end of the coil 23 is soldered as shown at 25 to the end of the tube for grounding connection. The other end of the coil 23 is brought out through an insulated opening in the cap portion 15 as a lead 24.

In similar fashion a wire coil 27 of pressure responsive material such as manganin is wound about the container segment 21. Insulation between the container 21 and the coil 27 is provided by a suitable insulating medium which also serves to seat the coil in position. The lengths of the wire coils 23 and 27 are such their respective resistivities are equal under static conditions. An end portion of the coil 27 is soldered to the cap portion 15 for ground connection as shown at 29 and brought out as a common ground lead 31, while the other end is terminated by lead 33.

In use, the viscometer 11 is positioned within a compressible metallic container 35 within which is held the liquid the viscosity of which is to be determined under certain test conditions. The container 35 is provided with appropriate openings through which the leads 24, 33 and common ground lead 31 can be brought to a bridge type circuit as hereinafter described.

Figure 2:
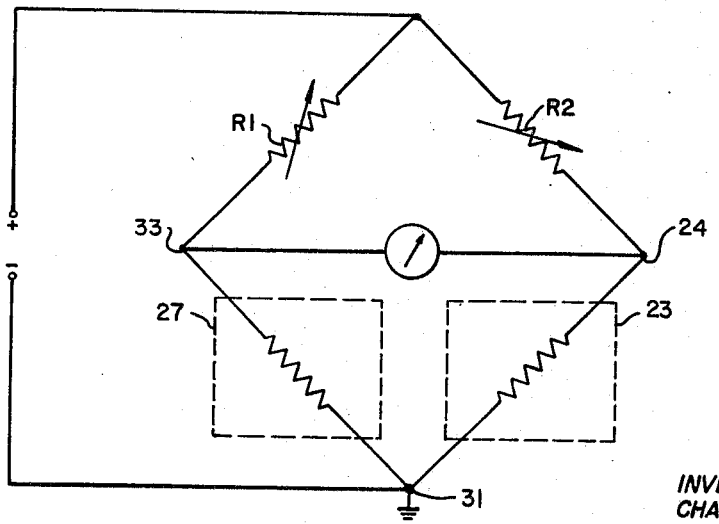
FIG. 2 is a schematic of a bridge type circuit for measuring the resistance of the pressure responsive wires of the device of FIG. 1.

The common ground lead 31 and the leads 33, 24 are connected to a bridge type circuit as shown in FIG. 2. As heretofore indicated, the coils 23 and 27 are made of manganin wire which has the property that its resistance varies linearly with pressure when such wire is properly treated. Such treatment consists of subjecting the coil to a temperature of about 150° C. for several days and allowing it to cool slowly. Because of this property, any change in pressure on either of the two coils will result in a linear change in resistance. Under a static condition with the pressure on the coil 23 equal to that of the coil 27, the bridge is made to balance by means of resistors R1 and R2. When a pressure pulse is applied to the collapsible container 35, the coil 27 is first effected and its resistance changes. However, there will be a time lapse before the pressure pulse arrives through the narrow bore 17 of tubular segment 13 to vary the resistance of coil 23. Such time factor unbalances the bridge immediately, but after a certain time lapse the bridge will rebalance. If the voltage across the null indicator of the bridge is fed into the Y input of an X–Y recorder and the time sweep is used in the X input, a decay curve will be recorded. The time constant of the decay curve is directly related to the viscosity of the pressure transmitting fluid. The following equation sets forth this relationship.

$$T = \frac{8\eta l \beta V_0}{\pi \alpha^4}$$

$\eta$ = viscosity (poises)
$l$ = length of tube (cm.)
$\beta$ = compressibility of the fluid (cm.³/dynes)
$V_0$ = volume of fluid (cm.³)
$\alpha$ = radius of hole (cm.)

Figure 3:
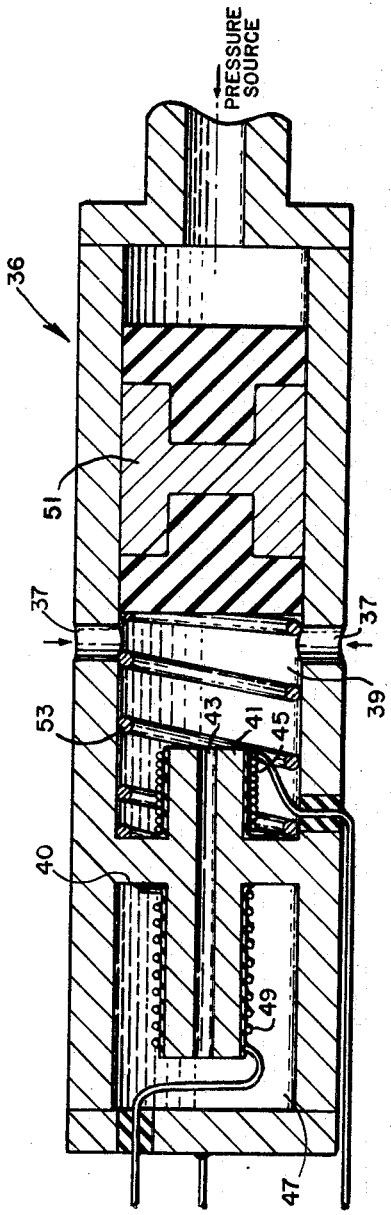
FIG. 3 is a cross-sectional view of a viscometer constructed in accordance with the invention herein.

FIG. 3 is an embodiment of the invention shown as a permanently installed viscometer testing device.

In such application there is shown a viscometer 36 of general tubular configuration. Included therein are two compartments 39 and 47 separated by a barrier 40 and an axially aligned tubular element 41 having a bore 43 coextensive therewith and providing a passageway between the compartment 39 and 47. For the entry and exit of a liquid, the viscosity of which is to be tested there are provided opposing ports 37. Wound about the support 41, and within the compartment 39 is a pressure responsive wire coil 45, similar to the coil 23 of the embodiment of FIG. 1. The other end of the support 41 is disposed in a chamber 47. Wound about that portion of the support 41 is also a pressure responsive wire coil 49 having the same resistivity under static conditions as the coil 45. Extending from, and wired to a bridge type circuit, are ground and output leads, in the same fashion as shown in FIG. 1.

The high viscous fluid is introduced through the ports 37 into compartment 39 and pressure is exerted by a piston 51 operated by any conventional means. Axial movement of the piston is such so as to close the ports 37. The pressure responsive coil 45 will be first affected to change its resistance. In the same manner as heretofore described in relation to the device of FIG. 1 there will be a time lapse before the pressure pulse arrives through the narrow bore 43 to vary the resistance of coil 49. Determination of the viscosity of the fluid can then be arrived at in the same manner as detailed heretofore. For returning the piston 51 to its original position, there is provided a coil spring 53.

Although the invention has been described with reference to particular embodiments thereof, it is manifest that these are by way of illustration only. Accordingly it is contemplated that many variations, modifications, and equivalents will be evident in view of the description herein.

What is claimed is:

1. A viscometer for monitoring the viscosity of a liquid which is subjected to extremely high pressures comprising first and second spaced coils of pressure responsive wire having the same static resistivity that are contained in discrete compartments which are interconnected by a channel through which said liquid flows when a pressure is applied, said channel being defined by a tubular element that extends into one of said compartments substantially the entire length thereof and about which said second coil is wound, wherein said first coil is first subjected to liquid pressure to change its resistivity and wherein said second coil is subjected to liquid pressure after a time lapse to change its resistivity whereby the viscosity of said liquid is a function of the time lapse between said changes of resistivity.

2. A viscometer system for monitoring the viscosity of a liquid which is subjected to extremely high pressures comprising
    (a) an outer deformable reservoir within which the liquid to be tested is contained,
    (b) an inner liquid container within said reservoir including a tubular arm extending to substantially the full depth thereof that permits access of liquid into the container,
    (c) a first coil of pressure responsive wire wound about said container, and
    (d) a second coil of pressure responsive wire having the same static resistivity as said first coil wound about the tubular arm.

References Cited

UNITED STATES PATENTS

| | | | |
|---|---|---|---|
| 3,273,400 | 9/1966 | Pastan | 73—398 |
| 3,326,047 | 6/1967 | Pastan | 73—398 |
| 3,336,555 | 8/1967 | Pastan | 73—398 X |
| 3,349,623 | 10/1967 | Pastan | 73—398 |

LOUIS R. PRINCE, Primary Examiner

JOSEPH W. ROSKOS, Assistant Examiner

U.S. Cl. X.R.

73—398